US011830215B2

(12) United States Patent
Amthor et al.

(10) Patent No.: US 11,830,215 B2
(45) Date of Patent: Nov. 28, 2023

(54) MICROSCOPE AND METHOD FOR DETERMINING A MEASURING LOCATION OF A MICROSCOPE

(71) Applicant: Carl Zeiss Microscopy GmbH, Jena (DE)

(72) Inventors: Manuel Amthor, Jena (DE); Daniel Haase, Zöllnitz (DE); Michael Gögler, Wolfratshausen (DE)

(73) Assignee: Carl Zeiss Microscopy GmbH, Jena (DE)

(*) Notice: Subject to any disclaimer, the term of this patent is extended or adjusted under 35 U.S.C. 154(b) by 436 days.

(21) Appl. No.: 17/150,482

(22) Filed: Jan. 15, 2021

(65) Prior Publication Data

US 2021/0225026 A1 Jul. 22, 2021

(30) Foreign Application Priority Data

Jan. 20, 2020 (DE) ............ 10 2020 101 191.1

(51) Int. Cl.
*G06T 7/73* (2017.01)
*G01B 11/00* (2006.01)
*G06T 7/80* (2017.01)
*G02B 21/36* (2006.01)
*G06T 7/11* (2017.01)

(52) U.S. Cl.
CPC ............. *G06T 7/73* (2017.01); *G01B 11/002* (2013.01); *G02B 21/36* (2013.01); *G06T 7/11* (2017.01); *G06T 7/80* (2017.01); *G06T 2207/10056* (2013.01)

(58) Field of Classification Search
CPC .... G06T 7/73; G06T 7/80; G06T 7/11; G01B 11/002; G02B 21/36

USPC ........................................................ 348/79
See application file for complete search history.

(56) References Cited

U.S. PATENT DOCUMENTS

| | | | |
|---|---|---|---|
| 8,233,041 B2 | 7/2012 | Ikeda et al. | |
| 8,564,655 B2 * | 10/2013 | Fujieda | G06T 7/0006 |
| | | | 348/91 |
| 2017/0032537 A1 | 2/2017 | Li et al. | |
| 2020/0088984 A1 | 3/2020 | Haase et al. | |

(Continued)

FOREIGN PATENT DOCUMENTS

| | | |
|---|---|---|
| DE | 102008041523 A1 | 4/2009 |
| JP | 2001291092 A | 10/2001 |
| JP | 2003015056 A | 1/2003 |

(Continued)

OTHER PUBLICATIONS

Sakurai, Hitoshi, JP Application No. 2021-002674, Office Action 1, dated Dec. 8, 2021, 6 pages (English translation provided).

(Continued)

*Primary Examiner* — Jeffery A Williams
*Assistant Examiner* — Kristin Dobbs
(74) *Attorney, Agent, or Firm* — LaBatt, LLC (57) ABSTRACT

An overview image of a sample carrier is obtained in a method for ascertaining a measurement location of a microscope. A mapping or homography is determined, by means of which the overview image is perspectively convertible into a plan view image on the basis of a height of the sample carrier. The measurement location is identified, with the aid of the determined mapping/homography, in the overview image or in an output image derived therefrom.

18 Claims, 4 Drawing Sheets

(56) References Cited

U.S. PATENT DOCUMENTS

2021/0181086 A1* 6/2021 Chou ................ G01N 15/1468

FOREIGN PATENT DOCUMENTS

| | | |
|---|---|---|
| JP | 2006038977 A | 2/2006 |
| JP | 2011112379 A | 6/2011 |
| WO | 2006135040 A1 | 1/2009 |
| WO | 2018219632 A1 | 12/2018 |

OTHER PUBLICATIONS

Winter, Johann, Search Report for DE102020101191.1, dated Oct. 1, 2020, 6 pages (English translation not available).
Toriya, Hisatoshi, Itaru Kitahara, and Yuichi Ohta, "A Mobile Camera Localization Method Using Aerial-View Images," 2013 Second IAPR Asian Conference on Pattern Recognition, 5 pages.
Winter, Johann, Search Report for DE102020101191.1 with English translation, dated Oct. 1, 2020, 10 pages.

* cited by examiner

MICROSCOPE AND METHOD FOR DETERMINING A MEASURING LOCATION OF A MICROSCOPE

REFERENCE TO RELATED APPLICATIONS

The current application claims the benefit of German Patent Application No. DE 10 2020 101 191.1, filed on 20 Jan. 2020, which is hereby incorporated by reference.

FIELD OF THE DISCLOSURE

The present disclosure relates to a microscope and a method for ascertaining a measurement location of a microscope.

BACKGROUND OF THE DISCLOSURE

A sample carrier is positioned on a sample stage in conventional microscopes. The sample carrier can comprise a plurality of sample vessels and can be formed, for example, by a chamber object carrier (multi-well chamber slide) or a multi-well plate with wells. In this case, in particular, it is difficult for the user to reliably recognize the well or the measurement location at which an objective of the microscope is directed. If manual stands are used, in which the sample carrier is moved by hand or using a xy-stage, there is, as a rule, no helpful information available about the sample stage position.

Microscope images are recorded by way of the objective and a downstream camera, with it being necessary to document the measurement location (e.g., the well of a multi-well plate) to which the respective microscope image belongs. To this end, columns and rows of a well in a multi-well plate currently under examination are frequently counted and this information is entered manually for the recorded microscope image. Here, the orientation of the multi-well plate must be correctly considered. Proper documentation can therefore require much effort and be error-prone.

Overview images can also be recorded, in particular for documentation purposes. An overview image of a sample carrier is obtained in a generic method, for example by way of an overview camera. The latter can be present in addition to the camera which receives detection light from the objective of the microscope. If overview images are recorded, the user, as a rule, has to carry out the aforementioned work steps in the prior art, which are accompanied by the aforementioned problems.

Fully automated solutions are known from high content screening. By way of example, all wells of a microtiter plate are approached in succession and examined in automated fashion in this case. Firstly, these systems are very costly and, secondly, their flexibility is limited. Thus, all multi-well or microtiter plates must be loaded with a certain orientation in this case and the required displacements, e.g., of a sample stage, from one well to the next must be known. This can only be implemented in automated fashion if the sample carrier is known, for example for specific microtiter plates from a certain manufacturer. In this case, too, a stop or a holder on the stage is required, as a rule, in order to specify positioning and orientation of the microtiter plate. For unknown sample carriers, there needs to be a manual check and documentation of the sample vessel currently under examination in the case of these systems.

It can be considered to be an object of the invention to specify a method and a microscope which permit a reliable capture of a measurement location of the microscope as easily as possible.

SUMMARY OF THE DISCLOSURE

This object is achieved by means of the method having the features of claim 1 and by means of the microscope having the features of claim 18.

Variants of the method according to the invention and of the microscope according to the invention are subjects of the dependent claims and will additionally be explained in the description that follows.

In the method of the aforementioned type, a mapping or projection is determined according to the invention, by means of which the overview image is perspectively convertible into a plan view image/top view image on the basis of the height of the sample carrier. This is followed by an identification, with the aid of the determined mapping, of the measurement location in the overview image or in an output image derived therefrom, for example in the plan view image.

The microscope of the invention comprises a computing device and an overview camera for recording an overview image of a sample carrier. The computing device is configured to determine a mapping, by means of which the overview image is perspectively convertible into a plan view image on the basis of the height of the sample carrier. Moreover, the computing device is configured to identify, with the aid of the determined mapping, the measurement location in the overview image or an output image derived therefrom.

The mapping can be a homography, which perspectively images or projects a plane in space into another plane. Thus, the homography describes how the image content of the overview image would be visible from a different viewing direction (specifically a plan view image).

Effects of the invention come particularly to bear if an overview camera for recording the overview image and a microscope objective are situated on opposite sides (above/below) of the sample carrier and the sample carrier does not have a negligible height. An example will be explained below to ease understanding. As a rule, an overview image is recorded at an angle to a measuring direction of the microscope. By way of example, a viewing direction of an overview camera can be at an angle to the optical axis of an objective of the microscope. The measurement location of the microscope can be located on the optical axis of the objective. However, in a recorded overview image, the image coordinates in the overview image through which the optical axis of the objective extends are not readily clear. These depend on the distance of the sample carrier from the overview camera, which is variable as a matter of principle. By way of example, different sample carriers (e.g., microtiter plates) can have different height dimensions, as a result of which the distance between the recorded microtiter plates and an overview camera is variable. Particularly if the overview camera is at an angle to the optical axis, the image coordinates of the measurement location in the overview image have a pronounced dependence on the height of the sample carrier or on the relative position thereof with respect to the overview camera. To take this dependence into account, a homography for the currently present sample height can be ascertained by way of the invention. As a result of this ascertained homography, it is possible to take account of the effect of the sample height on the image coordinates of the measurement location in the overview image.

A homography can be understood to mean a description or calculation rule relating to how points in one plane are perspectively imaged or projected into another plane. By way of example, an ascertained homography can be formed by a matrix, in particular a 3×3 matrix. It is possible to ascertain a homography which allows the overview image to be converted into a plan view image. This homography depends on the sample height, as explained above.

If a plan view image as output image is calculated from the overview image with the aid of the ascertained homography, the effect of the sample height on the image coordinates was removed in the output image. Independently of the specific sample height, the image coordinates of the measurement location of the microscope can always be the same in these output images. The values of the image coordinates of the measurement location can be specified in a plan view image. By way of example, the image coordinates at which the measurement location is situated in plan view images can be stored in a memory. Alternatively, these image coordinates for plan view images can also be calculated with the aid of known microscope parameters. Now, the measurement location can be identified by virtue of a calculated plan view image being used as a derived output image and the specified image coordinates, or the image coordinates stored in the memory, being identified herein as the measurement location.

As an alternative to the calculation of a plan view image from the overview image, the ascertained homography can also be used to convert the image coordinates of the measurement location in the plan view image into image coordinates of the measurement location in the overview image. Thus, the measurement location can be identified by virtue of the specified image coordinates or the image coordinates stored in the memory (of the measurement location in plan view images) being converted into a perspective of the overview image with the aid of the determined homography and these converted image coordinates being identified as measurement location. Consequently, it is not necessary to calculate a plan view image from the overview image.

A plan view image can be understood to mean an image in which a viewing direction is perpendicular to the sample carrier or a viewing direction is parallel to the optical axis/measurement direction of the microscope, in particular antiparallel to the measurement direction. The measurement direction can correspond to the optical axis of an objective. However, the microscope need not necessarily comprise an objective but might, for example, comprise a tactile measuring head or operate according to any other optical measurement principle. In more general variants, a plan view image can be understood to mean an image in a perspective that differs from the overview image, for which plan view image the image coordinates of the measurement location are known or initially determined. Typically, this knowledge can be obtained most easily if a viewing direction of the plan view image is parallel to the optical axis of the microscope objective; however, this is not mandatory. Consequently, for a certain sample height, the determined homography can describe the mapping of the overview image to another plane, for which the relative position of the measurement location of the microscope is known.

The measurement location of the microscope can be understood to mean that region of the sample carrier or a sample in the sample carrier which is located on the optical axis of the employed microscope objective. Expressed differently, the measurement location can be understood to mean a region of the sample/the sample carrier imaged in focus in a microscope image, or the centre of this region. The identification of the measurement location in the overview image or in an image derived therefrom should relate to lateral coordinates of the measurement location, which specify a position perpendicular to the optical axis. As a rule, an image of the sample carrier upper side is recorded in the overview image and not, for instance, an image of the detection plane, which is recorded in the microscope image and within which the measurement location is located. The sample carrier upper side is offset from the detection plane along the optical axis and, as a rule, is parallel to the detection plane. The projection of the measurement location on the sample carrier upper side or the point of intersection of the optical axis with the sample carrier upper side should be ascertained in the overview image or in an image derived therefrom. This point of intersection has the same lateral coordinates as the measurement location—it is for this reason that reference is also made in the present case to identifying the measurement location in the overview image or in an image derived therefrom.

The assumption can be made that the sample carrier has a planar surface; i.e., that it is substantially level. The height of the sample carrier can specify an elevation or height plane perpendicular to the measurement direction/optical axis of the microscope. Here, the elevation relates to the side or the structures of the sample carrier which are predominantly visible in the overview image. By way of example, if the sample carrier has a transparent lid, which is hardly visible in the overview image, and if, instead, the upper edges of sample vessels below the lid are more clearly visible, the height can relate to a height plane through these visible structures.

Expressed differently, the height or height dimension of the sample carrier can denote its dimension along the optical axis of the microscope objective, from a sample carrier lower side to a sample carrier upper side. This definition of height is appropriate if structures on the sample carrier side are visible in the overview image and used for ascertaining the homography. However, in some cases a sample carrier upper side is not sufficiently visible in the overview image and other sample carrier structures, which are situated between the sample carrier lower side and sample carrier upper side, determine the ascertainment of the homography instead. In such cases, the height of the sample carrier denotes a height of the aforementioned structures.

Ascertainment of the Height of the Sample Carrier

The homography to be determined depends on the height of the sample carrier. Here, the correct homography for a measurement situation present can be ascertained in various ways. By way of example, it is possible to initially ascertain the height of the sample carrier in order then to select a homography associated with this height. Alternatively, the various specified homographies for different heights can also be tested and there is an assessment as to which homography supplies the best results; then, this homography is then used further, as a result of which a homography that depends on the height of the sample carrier is selected but there is no direct determination of the height. Various procedures are described below.

The relative position of the sample carrier in relation to the overview camera is decisive for determining the correct homography. If the relative position between overview camera and the sample stage is known in advance, it is also possible to use the knowledge about the height dimension of the sample carrier to derive the height/elevation of the sample carrier.

In one variant of the invention, a calibration pattern with a known geometry is provided on the sample carrier. By way of example, a planar checker board pattern or any other pattern can be applied or positioned on the sample carrier. The pattern also be attached to the sample carrier edge or can be arranged by placement, adhesive bonding or resting thereagainst. Likewise, a pull-over frame or an insertion frame can be used as a calibration pattern, which is placed around the sample carrier as a frame. Determining the height of the sample carrier and/or determining the homography now comprises an identification and localization of an image representation of the calibration pattern in the overview image, or in an image derived therefrom, by means of an image analysis. Now, the height of the sample carrier and/or the homography can be derived from a localized relative position or perspective distortion of the image representation of the calibration pattern in an overview image. By way of example, the homography which supplies the best image rectification of the image representation of the calibration pattern can be selected from a plurality of specified homographies.

An overview image can also record a plurality of overview images in succession, in particular for generating a live stream. Described image analysis steps need not relate to the same overview image but might also relate to the overview images recorded in succession. By way of example, a calibration pattern can be recognized in a first overview image and the measurement location is determined with the aid of an ascertained homography on the basis of a second overview image. A calibration pattern might have optionally been removed before the second overview image is recorded. Thus, determining the homography can also be implemented with the aid of a different overview image than the determination of the measurement location in an overview image or an image derived therefrom.

Particularly in the case of a live stream of the overview camera, the image analysis also allows monitoring as to whether an image representation of a calibration pattern with a known geometry is contained in the overview images. Should this be the case, there can be an automated localization of the image representation of the calibration pattern in the overview image. A derivation of the height of the sample carrier and/or the homography is now implemented on the basis of a localized relative position or perspective distortion of the image representation of the calibration pattern. Accordingly, a user need only apply the calibration pattern but need not themselves start or carry out an image analysis or calibration pattern recognition. By way of example, the image analysis can be implemented by means of classification or detection.

In some variants of the invention, an optimization routine is used to ascertain the suitable homography. Here, use is made of an optimization function, in which the sought-after value is the height of the sample carrier. A homography dependent on this height is applied to the overview image and the resultant test image is assessed with a quality measure. The quality measure specifies the quality of the image rectification of the test image, for example the quality of the correspondence between sample vessel forms and a circular shape (eccentricity).

Alternatively, the height of the sample carrier can be ascertained in a first step and a homography is subsequently selected or calculated on the basis of the ascertained height. A specified list can contain homographies for different heights. Depending on the ascertained height, the homography whose height fits best to the ascertained height is selected. If the ascertained height lies between two heights contained in the list, it is also possible to interpolate the two associated homographies. Alternatively, a homography can also be calculated from the ascertained height, in particular in analytic fashion, with the aid of a specified formula.

To determine the height, it is also possible to illuminate spots on an upper side of the sample carrier at a specified angle. The position of the illumination spot is captured in the overview image, from which it is possible to derive the height. In particular, a mirror can be placed onto the upper side of the sample carrier. A light source illuminates the sample carrier with the mirror, whereby a light reflection in an overview image is measured. The position of the light reflection in the overview image is ascertained and the height of the sample carrier is derived therefrom. Specified homographies can also be directly linked in a table to positions of the light reflections, and so the height need not be explicitly captured or output. If the surface of a sample carrier is at least slightly reflective, it is not mandatory for a mirror to be placed thereon; rather, a position of a light reflection from the upper side of the sample carrier can also be ascertained in the overview image.

Alternatively, a size or position of an image representation of an element in the overview image can be determined by means of image analysis for the purposes of ascertaining the height. A height of the sample carrier or the homography can thereupon be derived from the measured size or position of the image representation of the element By way of example, it is possible to ascertain a lid geometry, in particular a lid width, in an overview image. Since multi-well plates, in particular, have a defined size, it is possible to determine the height from the size of the lid, for example, in the overview image. It is also possible to ascertain a displacement between well base and well lid in order to derive the height of the sample carrier therefrom. It is likewise possible to measure an edge height of the sample carrier in an overview image; this likewise depends on the height of the sample carrier. Furthermore, it is possible to find right angles or to measure angles in the overview image. Now, a homography can be estimated or selected in such a way that right angles on the sample carrier (e.g., at corners) also yield right angles in the perspectively corrected output image obtained from the overview image with the aid of the homography. The homography which supplies the output image in which the sample carrier angles are closest to right angles can be selected from a plurality of specified homographies for different heights.

A position or size can be determined in an overview image, for the purposes of which the sample carrier on the sample stage is arranged in a calibration position. The sample carrier might have been laterally displaced thereto in the case of overview images recorded at different times.

The aforementioned steps for determining the homography can be performed automatically, in particular by image processing algorithms and/or machine learning algorithms, or else manually.

In a further variant of the invention, image analysis is performed on the overview image for the purposes of type recognition or classification of the sample carrier. By way of example, it is possible to recognize what type (in particular, manufacturer and model) of multi-well plate or multi-well chamber slide is present. In particular, this can be implemented by machine learning algorithms, for which overview images various types of multi-well plates or multi-well chamber slides were learnt. A respective geometry information item, in particular a respective height, can be stored in a database for various sample carrier types. This can be understood to mean that either the height/elevation itself is stored, or else a value by means of which this is derivable, for instance a height dimension of the sample carrier which yields the desired elevation when combined by calculation with the sample stage height known in advance. Another example of geometry information/a geometry information item are coordinates of a point pattern on an upper side of the sample carrier. By way of example, the coordinates of the four corners of the upper side of the rectangular sample carrier can be stored, wherein the four corners do not form a rectangle but a perspectively distorted quadrilateral depending on the viewing angle of an overview image. The sought-after mapping/homography is ascertained with the aid of this geometry information item. For instance, a calculation rule can be determined from the stored point pattern (e.g., the distorted quadrilateral), which calculation rule converts the point pattern into the perspective of a plan view (in which the distorted quadrilateral becomes a rectangle). As an alternative to geometry information items, the sought-after mapping can be read directly from a database for the sample carrier type; in this case, mappings for various sample carrier types are stored in the database.

If a certain type is recognized in the image analysis, the height of the sample carrier is read from the database and this height is used for determining the homography.

If a previously unknown sample carrier type is determined within the scope of the type recognition, for which no geometry information item (in particular no height) is stored in the database, then one of the following steps can be carried out:
- requesting the user enter a geometry information item about the sample carrier, in particular a height thereof; (in particular, geometry information items can also be entered by virtue of a user marking characteristic regions, e.g., corners of the sample carrier, in the overview image) and/or
- deriving a geometry information item about the sample carrier, in particular a height thereof, from an image representation of a calibration pattern or element with a known geometry that was recognized in the overview image and/or
- requesting the user applies a calibration pattern, with a subsequent derivation of a geometry information item about the sample carrier, in particular a height thereof, from an image representation of the calibration pattern with a known geometry that was recognized in the overview image and/or
- testing various homographies for ascertaining the best-suited homography; in particular, specified homographies can be applied to the overview image and can be assessed or an optimization algorithm alters variable parameters of a homography until an optimization result is accepted as best-suited homography.

Optionally, the database can now be supplemented with the geometry information item or the homography for the previously unknown sample carrier type present.

A height of the sample carrier and/or the sought after homography can also be ascertained by a comparison of two or more different overview images. To this end, use can be made of overview images, between which the sample stage was displaced in each case, in particular in the lateral direction perpendicular to the optical axis of the microscope. Alternatively, the two overview images can also be recorded from different perspectives (e.g., by the use of a plurality of overview cameras), as a result of which a movement of the sample carrier is no longer necessary. Thereupon, the respective displacement of one or more elements in the overview images is ascertained. At least one of the elements is situated on an upper side of the sample carrier. By way of example, the element can be a corner or a point of an edge of the sample carrier upper side or an upper edge of one of the sample vessels of the sample carrier. The element can also be writing or a marking on the upper side. In particular, it is possible to ascertain how a relative position defined between an image representation of (at least) one element on the sample stage and an image representation of (at least) one element on an upper side of the sample carrier changes between two or more overview images. The height of the sample carrier and/or the homography can now be derived from the ascertained change in this relative position.

The homography can also be determined by testing a plurality of homographies. Thus, various homographies can be applied to the overview image, wherein the various homographies belong to different heights. By way of example, 50 specified homographies might be tested, which belong to sample carrier heights from 0 mm to 50 mm with a 1 mm interval. A respective test image is generated from the overview image using each of these specified homographies. There now is an assessment as to which of the test images has the best image rectification. Assessment criteria might be, e.g., the trueness of angle or the parallelity of straight lines. Sample carriers often have rectangular form, and so a correctly rectified test image should exhibit 90° angles or mutually parallel opposite edges. In the image with the correct image rectification, circular wells of a microtiter plate should be circular and not elliptical. The homography of the test image exhibiting the best image rectification is identified/set as the homography by which the overview image can be converted perspectively into the plan view image. As an alternative to specified homographies, use can also be made of an optimization method which calculates homographies not defined in advance, uses these to generate and assess test images and finally outputs the homography which produces the test image with the best image rectification.

A sample carrier height can also be ascertained by at least two overview images which were recorded from different observation angles. To this end, an overview camera can be displaceable or a plurality of overview cameras are present, which are directed at the sample from different observation angles. Now, the height of the sample carrier can be derived from differences between the at least two overview images. In particular, two overview cameras can be directed at the sample stage in a manner orthogonal to one another. Now, it is possible to determine image displacements with only one degree of freedom present; the latter corresponds to the sought-after height of the sample carrier. By way of example, this can be implemented by way of segmentation masks.

In principle, the height of the sample carrier can also be specified manually by the user. Moreover, this can occur implicitly by way of entering the sample carrier type if a respective height is stored for various sample carrier types.

Identifying Sample Regions from the Overview Image

It may be desirable for the measurement location of the microscope not to be output or not only to be output in the form of image coordinates in the overview image. Rather, an identification may be desired, in respect of the sample region in the overview image in which the measurement location is located. In particular, sample regions can be different sample chambers or sample vessels of a sample carrier. Initially, a plan view image can be calculated from the overview image with the aid of the determined homography. Then, sample regions are identified in the plan view image by means of image analysis. Subsequently, the identified sample region in which the measurement location is located is ascertained and output.

The localization of a plurality of sample regions in the plan view image can comprise, in particular, a segmentation, i.e., a pixel-by-pixel classification of the plan view image into various classes. The classes comprise one or more of the following classes: "sample chamber", "sample carrier", "sample region", and "background" and might also comprise further classes. As a result, regions of the sample chamber are localized with pixel accuracy in the plan view image. The "sample carrier" class specifies which pixels show a part of the sample carrier that is not a sample chamber, i.e., for example, the regions of the sample carrier between sample chambers. The "background" denotes a region laterally outside of the sample carrier, where the sample stage, for example, might have been recorded.

The localization of a plurality of sample regions in the plan view image can alternatively also comprise a detection of sample chamber image representations in the plan view image and an estimation of the geometric extents, e.g., by means of bounding boxes.

A refinement of the segmentation or detection by a regular pattern corresponding to the sample carrier can optionally be supplemented. Different patterns can be stored for different sample carriers. Alternatively, the pattern can be derived from the sample chamber image representations ascertained by segmentation or detection. By way of example, a pattern can be understood to mean that circular sample vessels are present, the diameter and spacing from one another are calculated as average of the diameters and spacings of the sample vessels ascertained in the overview image.

A sample carrier type can be ascertained, in particular by a manual entry by a user or by image analysis. The analyzed image can be an overview image or an image derived therefrom, in particular the output image or plan view image. Respectively assigned sizes and arrangements of sample chambers can be stored for various sample chamber types. By way of example, the sample carrier type can be a certain style of microtiter plate, for which the number, size and relative position of the wells (in particular, relative to the sample carrier edge) are stored. The localization of sample regions or sample chambers in the image by means of image analysis comprises an ascertainment of the relative position, in particular a displacement and rotation, of the image representation of the sample carrier in the analyzed image. Then, the image regions in which sample chamber image representations are situated is derived from the ascertained relative position and the ascertained sample carrier type. The stored information item in respect of a sample carrier type can relate to a plan view image; for example, the information items might describe circular wells in a rectangular pattern. If the overview image is analyzed instead of a plan view image, the ascertained homography is used to perspectively adapt the stored information items to the overview image, whereby elliptical well image representations might be present, for example.

Identifying the Measurement Location in Plan View Images

The image coordinates of the measurement location in plan view images can be stored in a memory. This information item might have been obtained by way of a calibration of an overview camera. The calibration can be implemented relative to the measuring direction of the microscope or relative an optical axis of the microscope objective. In this case, the overview camera records a calibration image. The latter can be recorded in the same way as an overview image, with a pattern (calibration pattern) optionally being arranged on the sample stage. Now, a homography is ascertained in respect of a certain elevation, e.g., in respect of the sample stage plane, by means of which the calibration image is perspectively converted into a plan view calibration image. Thereupon, a point of intersection or a point of penetration of the optical axis/measurement axis is determined in the plan view calibration image. To this end, a user can, for example, compare a microscope image recorded by way of the microscope objective to the plan view calibration image and mark the coordinates corresponding to the centre of the microscope image as the point of intersection in the plan view calibration image. The coordinates of the point of intersection in the plan view calibration image are stored in order to be used as coordinates of the measurement location to be identified in a plan view image. Since plan view images are perspectively corrected overview images which are parallel to the sample stage plane, the measurement location coordinates in the plan view images are independent or largely independent of the height of the sample carrier.

Image Analysis by Machine Learning

Some or all of the image analyses types specified in the present disclosure can be implemented by means of machine learning algorithms. Here, a model for the segmentation and classification of the sample carrier or the detection of the sample chambers can be generated on the basis of the training set and associated annotations by means of supervised learning. In particular, deep learning methods can be used.

The properties of the invention described as additional microscope features also yield variants of the method according to the invention when used as intended. Conversely, the microscope, in particular the computing device thereof, can also be configured to carry out or prompt the described method variants.

The specified computing device can be designed by a computer situated at the microscope or, alternatively or in part, by a remote server or computer which, for example, communicates with electronic components in the surroundings of the microscope stand by way of a network connection. The various image analyses and microscope controls described herein can be implemented by the computing device. Software required to this end can be stored in the computing device. The computing device can also be formed by or comprise one or more processors, in particular graphics processors (GPUs). GPUs may provide faster training of machine learning models.

The overview image need not necessarily be recorded at an angle to the optical axis of the microscope. Instead, a viewing direction when recording the overview image can also be parallel or antiparallel to the measurement direction of the microscope. In general, the height of the sample carrier also has an effect on the coordinates of the measurement location in the overview image even in these cases. The sought-after homography consequently generally describes a perspective mapping of the overview image onto another plane which corresponds to a different observation angle and/or observation distance from the sample carrier (or to the upper side thereof).

Further variants of the invention result if a "mapping" is used in the descriptions above instead of a "homography". The mapping need not necessarily comprise a calculation rule as to how one plane in space is converted into another plane. Rather, the mapping could also be learnt by machine learning algorithms, for example. In this case, there likewise is a calculation or selection from the image content of the overview image or else from other information items as to how the overview image should be converted into a plan view image. Geometrically, this need not necessarily correspond to a homography.

In an independent concept of the invention, it is possible to learn how the image coordinates of the measurement location are derived directly from an overview image. By way of example, this can be learned by means of a regression. Employed training data show overview images of sample carriers with different heights, wherein a measurement location is annotated in each case as a target variable of the machine learning algorithm. Consequently, the algorithm learns to deduce the coordinates of the measurement location in the overview image without having to ascertain or apply a homography in this case.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Figure 1:
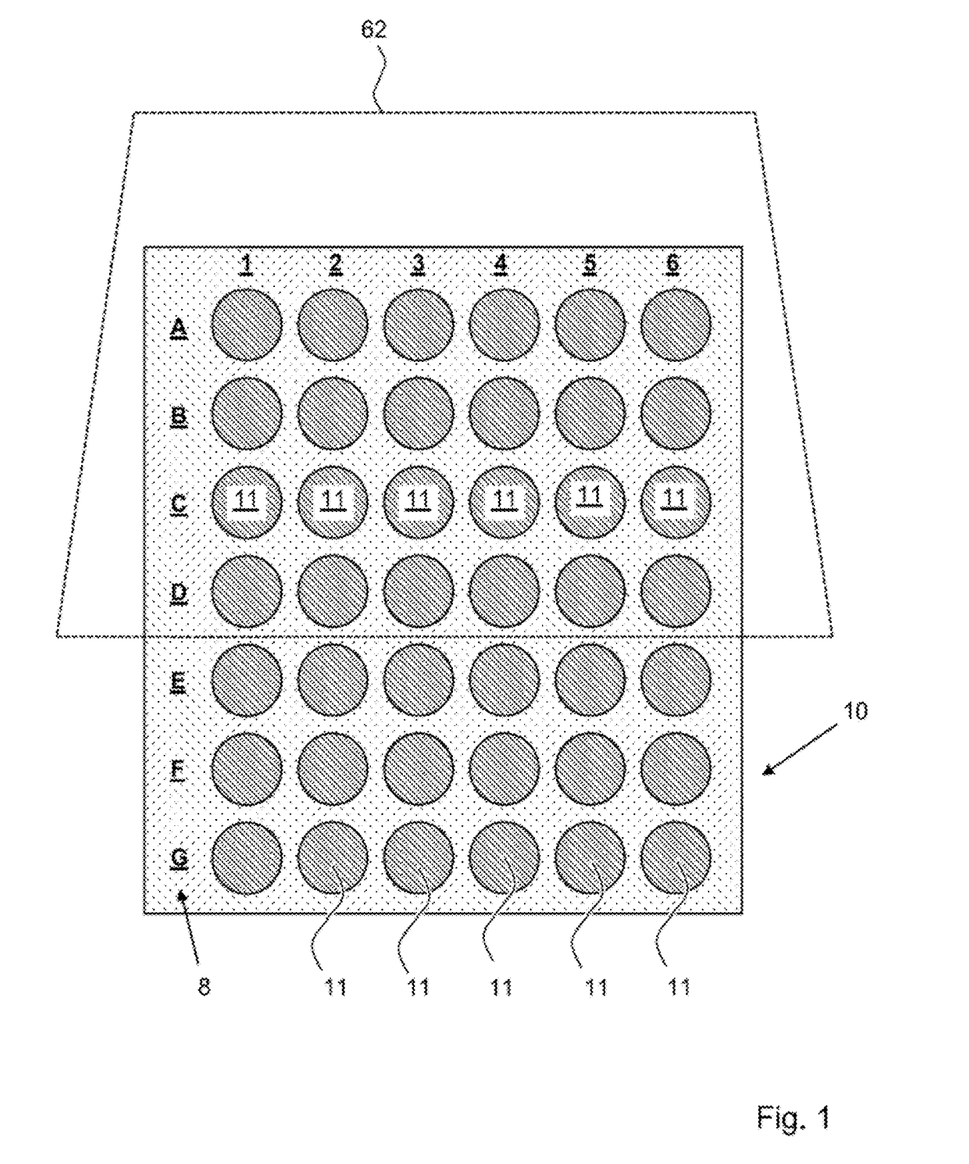
FIG. 1 is a schematic illustration of a sample carrier for explaining aspects of the invention.

FIG. 1 schematically shows a sample carrier 10 with a plurality of sample vessels 11. In the illustrated example, this is a microtiter plate with a plurality of wells, wherein any other container could also be possible as a sample vessel 11. In this example, the sample vessels 11 are arranged in columns and rows, wherein a row label 8 specifies the various rows A-G and a column label specifies columns 1-6. The microscope is used to successively examine (the sequence is not mandatory) the various sample vessels 11 and record a microscope image in each case. In the process, there is a need for reliable documentation as to the sample vessel 11 to which the recorded microscope images belong.

Figure 2:
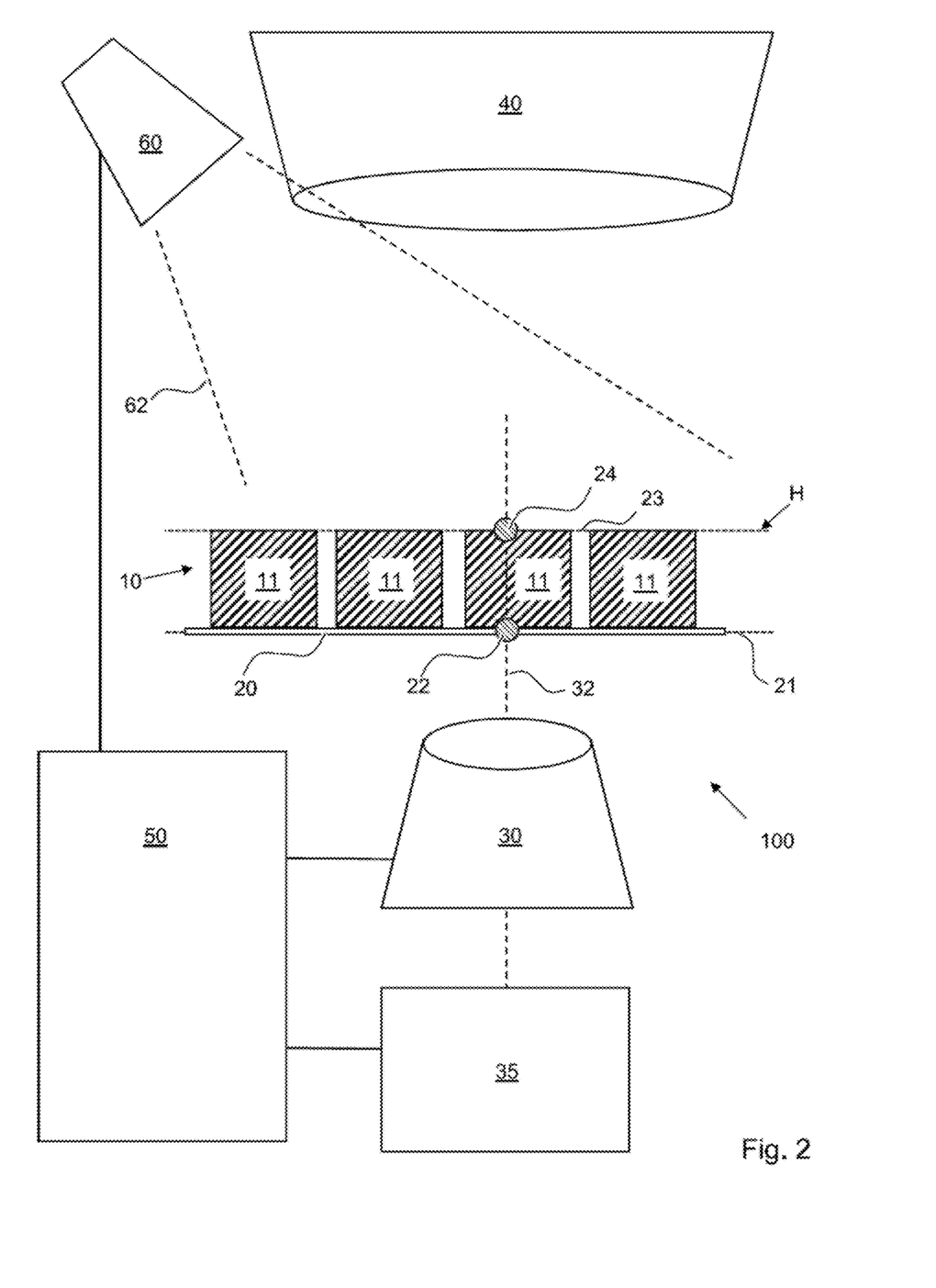
FIG. 2 is a schematic illustration of an exemplary embodiment of a microscope according to the invention.

This is achieved by a microscope 100 according to the invention, as is shown in exemplary fashion in schematic FIG. 2. The microscope 100 comprises a sample stage or microscope stage 20, on which the sample carrier 10 is positioned. As described, the sample carrier 10 comprises a plurality of sample vessels 11, in at least some of which samples to be examined are situated. Illumination light is guided to the sample carrier 10 via a condenser 40. Detection light emanating from a sample can be detected via an objective 30 with a camera 35. In this example, the sample stage 20 is adjusted by hand, as a result of which the relative position with respect to the objective 30 is not known per se. Therefore, a measurement location 22, at which an optical axis 32 of the objective 30 impinges on the sample, is not known without further measures. Therefore, it is necessary to ascertain the measurement location 22 or the information item in respect of the sample vessel 11 impinged upon by the optical axis 32. This object also holds true in the case of sample stages that are adjustable in motor-driven fashion, in which the position of the sample stage 20 relative to the objective 30 may be known but the relative position of the sample carrier 10 on the sample stage 20 may not necessarily be known or may deviate from an expected relative position.

An overview camera 60 is used to determine the measurement location 22 of the objective 30 and of the camera 35. The field of view 62 of the overview camera 60 is plotted using dashed lines in FIG. 2 and covers the entire sample carrier 10 or a part of the sample carrier 10. For a unique identification of sample vessels 11, the field of view 62 may cover two or more edges of the sample carrier 10; cf. FIG. 1. A lateral position of the measurement location 22, i.e., a specification of the location of the measurement location 22 perpendicular to the optical axis 32, should be determined from the recorded overview image. By way of example, the location specification can be an identification of the sample vessel 11 through which the optical axis 32 extends at the current time or while the microscope image is recorded. In the illustrated example, the overview camera 60 is located on opposite side of the sample vessel 10 relative to the objective 30. As a result, the overview camera 60 records an overview image of an upper side 23 of the sample carrier 10. A plane of the upper side 23 perpendicular to the optical axis 32 specifies the height H of the sample carrier 20. In general, the measurement location 22 is offset along the optical axis 32 to the upper side 23 recorded in the overview image. Depending on the microscope setting, the measurement location 22 is located in the region of a lower side 21 of the sample carrier 10 or at a distance from the upper side 23 in any case. Therefore, a point of intersection 24, which corresponds to the projection of the measurement location 22 on the upper side 23 along the optical axis 32, should be ascertained in the overview image. The relative position of this point of intersection 24 in the overview image specifies the lateral relative position of the measurement location 22.

A difficulty results from the fact that the height dimension of the sample carrier 10, and hence the relative position of the upper side 23, is unknown or variable. In the overview image, the relative position of the point of intersection 24 varies depending on the spacing between the upper side 23 and the overview camera 60 and consequently depending on the height H. The invention provides a solution allowing the lateral relative position of the measurement location 22 to be deduced from the overview image. To this end, a computing device 50 evaluates recorded overview images. As indicated in FIG. 2, the computing device 50 can also be configured to control or communicate with different components of the microscope 100, in particular the overview camera 60, the camera 30 or a light source, not illustrated here, which illuminates the sample carrier 10 via the condenser 40.

Figure 3:
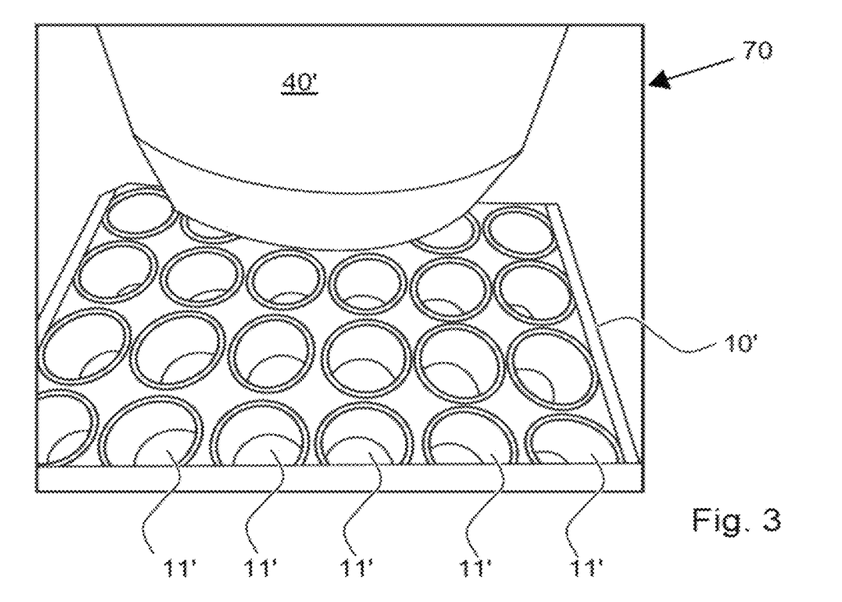
FIG. 3 schematically shows an overview image recorded by the microscope of FIG. 2.

The evaluation of an overview image by the computing device 50 is described in more detail with reference to FIGS. 3 and 4. FIG. 3 shows an overview image 70. An image representation of the sample carrier 10' with the sample vessels 11' is identifiable therein. The illustrated example also contains an image representation of the condenser 40' in the overview image 70; however, depending on the arrangement of the overview camera 60, this is not mandatory.

In this example, the upper side 23 of the sample carrier 10 has a rectangular form with circular sample vessels 11, as a result of which the form of the image representation 10' of the sample carrier and the form of the image representation 11' of the sample vessels are perspectively distorted in the overview image 70.

Figure 4:
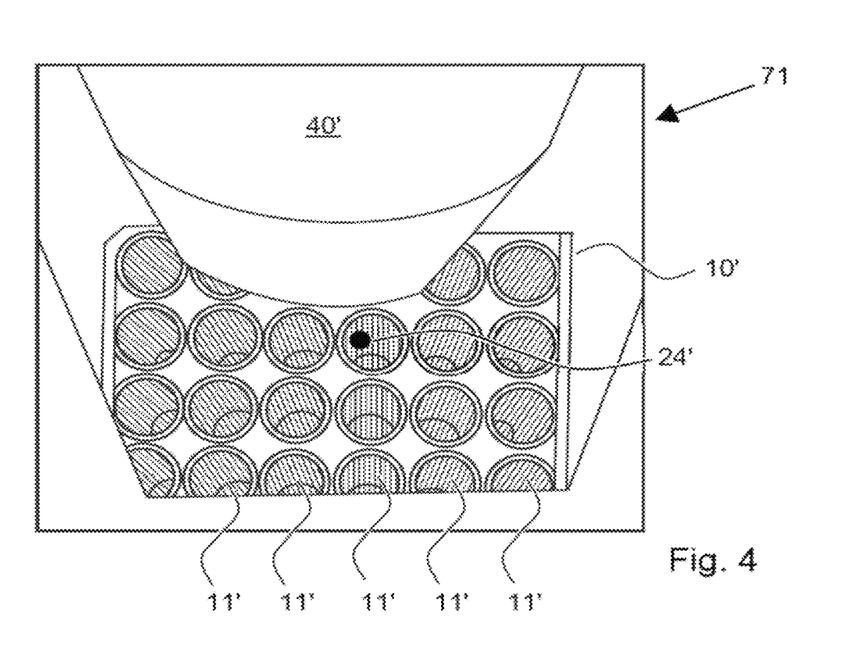
FIG. 4 schematically shows a plan view image calculated from the overview image of FIG. 3.

The overview image 70 is rectified, as a result of which the plan view image 71 shown in FIG. 4 is produced. More precisely, the image information items from the plane of the upper side 23 of the sample carrier 10 are rectified. As a result, the image representation 10' of the upper side 23 of the sample carrier has a rectangular form in the plan view image 71 and the image representations 11' of the upper edges of the sample vessels are circular.

Such image transformations are referred to as mappings or, in particular, homographies. What is applicable to a mapping or homography in order to produce a correctly rectified plan view image 71 from the overview image 70 depends on the relative position of the upper side 23 in relation to the overview camera, 60, i.e., depends on the height H.

A plan view image 71 firstly makes image analyses easier since there is no need to take account of an (unknown) distortion, as a result of which the image representations of sample carrier 10' and sample vessels 11' can be identified more reliably. In particular, this can be implemented by machine learning algorithms.

Moreover, a plan view image may facilitate ascertaining the measurement location 22, for the purposes of which reference is made to FIG. 2. In the case of the plan view image (which would correspond, for example, to a view from the condenser 40), the height H has no influence on the image coordinates of the point of intersection 24. This is different in the case of the oblique image recording by the overview camera 60: Depending on the height H, the point of intersection 24 is displaced along an optical axis 32, displayed using dashed lines, leading to a displacement in the overview image. However, if the overview image is converted into a plan view image with the applicable homography, the image coordinates of the point of intersection 24 in the plan view image are once again independent of the height H or the mathematical dependence on the height H in the plan view image is known. The image representation 24' of the point of intersection, which specifies the measurement location 22 of its projection on the upper side of the sample carrier 10, is plotted in FIG. 4. Moreover, the image representations 11' of the sample vessels were localized by image analysis in FIG. 4, and so it was possible to produce an output relating to the image representation 11' of the sample vessels in which the image representation 24' of the point of intersection is located, i.e., the sample vessel 11 in which the measurement location 22 is located.

In the exemplary embodiment described above, the homography for the height H is used to calculate a plan view image in order to identify the measurement location 22 or the point of intersection 24 therein. However, the homography for the height H can also be used to convert the plan view image coordinates of the image representation 24' into overview image coordinates. Thus, the homography for the height H is used in this case to calculate the coordinates of the point of intersection 24 in the overview image 70 and it is not necessary to calculate a plan view image 71 from the overview image 70.

Exemplary Embodiments of the Method of the Invention

Figure 5:
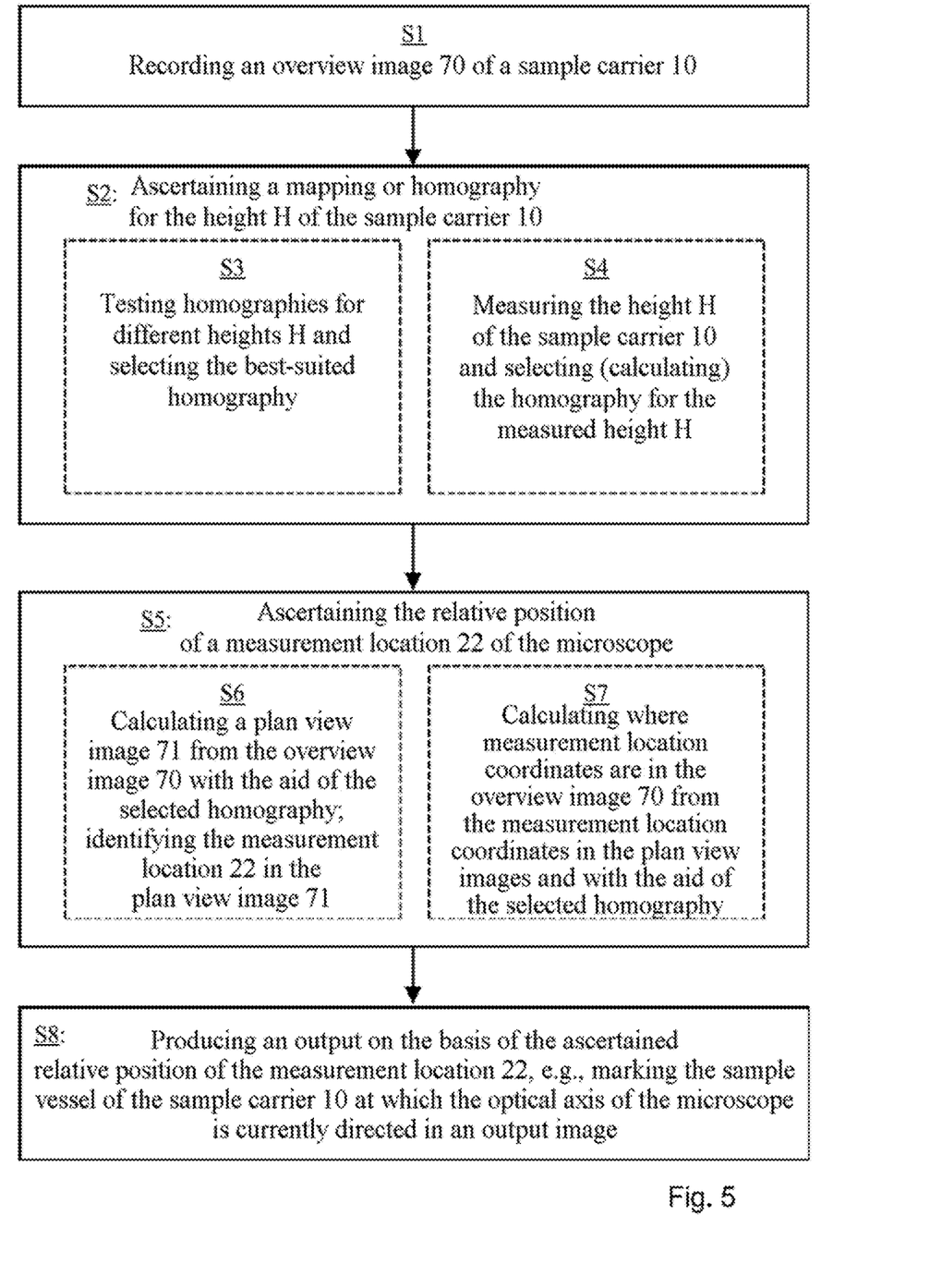
FIG. 5 is a flowchart for explaining an exemplary embodiment of a method according to the invention.

Steps of exemplary embodiments of the method according to the invention are explained in more detail with reference to the flowchart of FIG. 5.

First, an overview image 70 of the upper side 23 of the sample carrier 10 is recorded in step S1.

The homography fitting to this overview image 70 is ascertained in step S2. As described, the fitting homography depends on the height H of the sample carrier.

With the aid of the ascertained homography, the measurement location 22 or the point of intersection 24 in the overview image 70 or in an output image derived therefrom is determined in step S5.

An output is produced on the basis of a relative position of the measurement location in the output image in step S8.

S2 can optionally be implemented by a step S3 or a step S4. Various homographies are applied to the overview image 70 in S3. A plurality of test images are produced thus. The various homographies are specified and each describe a correct image rectification for a respective height H. An assessment is now carried out as to which test image supplies the best rectification for the overview image present, and the associated homography is selected. Here, the height H is only determined indirectly by the selection of one of the homographies.

Alternatively, the height H can initially be ascertained by measurement in S4. Thereupon, the homography corresponding to the measured height H can be selected, for example, from a given list of homographies for different heights.

Various examples and variants of steps S3 and S4 are specified in more detail in the general part of the description.

For the subsequent step S5, the relative position of the measurement location 22 of the microscope can be known in advance for plan view images or can be ascertained by calibration measurement. However, since it was not a plan view image but an overview image from an oblique angle that was recorded in S1, it is now an object to establish the spatial relationship between the measurement location 22 and the overview image 70 in step S5. By way of example, S5 can be implemented by step S6 or step S7. In S6, a plan view image 71 in which the image coordinates of the measurement location are known is calculated from the overview image 70 with the aid of the homography of S2. Alternatively, the known measurement location coordinates for plan view images are converted in S7 into image coordinates for the overview image 70 with the aid of the homography from S2. In this way, the measurement location is identified not in a plan view image 71 but in an overview image 70. In further examples, it is also possible for an output image obtained from the overview image to be calculated and for the measurement location coordinates for plan view images to be converted for a perspective of this output image.

In a step S8, an output is produced on the basis of the ascertained relative position of the measurement location 22 in the output image, wherein the output image can correspond, in particular perspectively, to the overview image or to a plan view image. By way of example, a plurality of sample vessels 11 of the sample carrier 10 can be identified in the output image by image analysis methods and the sample vessel 11 at which the optical axis of the microscope is currently directed, i.e., the sample vessel in which the measurement location 22 is currently located, is marked in the output image.

Instead of a sample carrier 10 with a plurality of separated sample vessels, use can also be made of a sample carrier with a plurality of sample regions. By way of example, the sample carrier can be a Petri dish, in which a plurality of sample regions, in particular spaced apart sample regions, are provided. By way of example, such Petri dishes are conventional in in vitro fertilization. The explanations made above in respect of sample vessels also apply analogously to these sample regions.

Further examples of outputs in step S8 are described below:

An identification specification of a sample region or sample chamber, in which the measurement location is located, can be output. In particular, there can be a numbered assignment of the found wells (pots) of the sample carrier, e.g., in the form "A1", "B5", etc. To this end, the wells are localized in the overview image or in an image obtained therefrom, e.g., the plan view image, by means of image analysis and said wells are counted from a sample carrier edge such that a column and a row can be specified for each well. In this case, the sample carrier can also be classified by means of image analysis, as a result of which the overall number of columns and rows is known. Counting wells from any edge in the overview image is possible then, even if it is not the entire sample carrier that is recorded in the overview image. Alternatively, it is possible to identify markings which adjoin a sample vessel on the sample carrier, e.g., "A1", as is conventional for some multi-well plates. By way of example, these can be recognized by OCR (optical character recognition), whereby the adjacent sample vessel is identified. Consequently, counting or the context information in the overview image required for counting is not needed.

Then, provision can be made, in particular, for one or more microscope images to be recorded with a microscope, a sample region around the optical axis being imaged therein. A plurality of microscope images can show laterally offset sample regions, in particular. Now, identification specifications can be stored in a step S8 as metadata for an associated microscope image, which, in particular, was recorded with the same stage position as the overview image.

Additionally, an overview image or an image derived therefrom can be presented in S8, wherein a current measurement location is marked and/or the sample regions for which microscope images that have already been recorded are marked (tracking). Moreover, it is possible to indicate the section of a sample vessel for which a microscope image is or has been recorded Available information for a fill of the sample vessels can be linked with the processed overview image or the filled sample vessels can be identified from the overview image by way of image analysis. It is possible to document that all (filled) sample vessels were examined, for example by virtue of worked-through wells/sample vessels being represented in a different colour. This can also prevent the same sample vessel from inadvertently being examined twice; conventionally, there is a risk of this happening if the user changes the measurement position and assumes that the adjacent sample vessel has already been reached. An output of S8 can also be used to control motor-driven sample stages. In the motor-driven control, it is possible to take account of an orientation of the sample carrier, sample vessel size and/or fill of individual sample vessels, which are derived from the overview image.

The information item in respect of the measurement location or sample vessel for which a microscope image was recorded can also be used to subsequently retrieve this sample region and, in particular, approach the latter automatically. By way of example, this can be used in scratch assays, in which a cell migration after scratching is intended to be observed.

Using the variants of the invention described, it is possible to cost-effectively provide a flexible and reliable ascertainment of the measurement location in overview images or images derived therefrom.

LIST OF REFERENCE SIGNS 1-6 Column numbers of the sample carrier 10
8 Line marking of the sample carrier 10
10 Sample carrier, microtiter plate
10' Image representation of the sample carrier 10 in the overview image or plan view image
11 Sample vessel of the sample carrier 10
11' Image representation of the sample vessel 11 in the overview image or plan view image
20 Sample stage
21 Plane of the lower side of the sample carrier 10
22 Measurement location
23 (Plane of the) upper side of the sample carrier 10
24 Point of intersection of the optical axis 32 with the upper side 23 or projection of the measurement location 22 onto the upper side 23
24' Image representation of the point of intersection 24 or the measurement location 22 in the overview image or plan view image
30 (Microscope) objective
32 Optical axis of the objective 30
35 Camera
40 Condenser
40' Image representation of the condenser 40 in the overview image or plan view image
50 Computing device
60 Overview camera
62 Field of view of the overview camera 60
70 Overview image
71 Plan view image, calculated from the overview image 70
100 Microscope
A-G Line markings of the sample carrier 10
H Height of the sample carrier 10
S1-S8 Method steps

We claim:

1. A method for ascertaining a measurement location of a microscope, comprising:
   receiving an overview image of a sample carrier;
   determining a mapping by which the overview image is perspectively convertible into a plan view image in dependence of a height of the sample carrier, wherein measurement location image coordinates for the plan view image are stored in a memory; and
   identifying, with the aid of the determined mapping, the measurement location in the overview image or in an output image derived therefrom;
   wherein the measurement location is identified by virtue of:
   A) calculating the plan view image from the overview image as the output image with the aid of the determined mapping, and identifying the measurement location image coordinates stored in the memory as the measurement location in the output image; or
   B) converting the measurement location image coordinates stored in the memory to a perspective of the overview image or the output image with the aid of the determined mapping, and identifying these converted image coordinates as the measurement location in the overview image.

2. The method as defined in claim 1,
   wherein the mapping is a homography.

3. The method as defined in claim 2,
   wherein the derived output image is the plan view image, which is calculated from the overview image with the aid of the determined homography.

4. The method as defined in claim 2,
   further comprising providing a calibration pattern with a known geometry on the sample carrier;

localizing an image representation of the calibration pattern in the overview image or in a further overview image by image analysis; and deriving at least one of the height of the sample carrier or the homography from a localized relative position or perspective distortion of the image representation of the calibration pattern.

5. The method as defined in claim 2, further comprising using the image analysis to monitor whether the overview image or a further overview image includes an image representation of a calibration pattern with a known geometry and, should this be the case, automatically localizing the image representation of the calibration pattern in the overview image or further overview image and deriving the height of the sample carrier or the homography from a localized position or perspective distortion of the image representation of the calibration pattern.

6. The method as defined in claim 2, further comprising ascertaining the height of the sample carrier; and calculating or selecting the homography on the basis of the ascertained height.

7. The method as defined in claim 2, further comprising ascertaining a size or position of an image representation of an element in the overview image by image analysis; and deriving the height of the sample carrier or the homography from the measured size or position of the image representation of the element.

8. The method as defined in claim 1, further comprising analysing the overview image to recognize the type of sample carrier;

if a certain sample carrier type is recognized:

retrieving associated geometry information of the sample carrier from a database, in which geometry information is stored for various sample carrier types, wherein the mapping is deduced with the aid of the geometry information or retrieving the mapping for the sample carrier type from a database, in which mappings for various sample carrier types are stored.

9. The method as defined in claim 8, wherein, if a previously unknown sample carrier type is determined in the type recognition, one or more of the following processes are carried out:

requesting a user to enter geometry information about the sample carrier;

deriving geometry information about the sample carrier from an image representation of a calibration pattern with a known geometry that was recognized in the overview image;

requesting a user to provide a calibration pattern, subsequently recording a further overview image and deriving geometry information about the sample carrier from an image representation of the calibration pattern that was recognized in the further overview image;

followed by at least the following processes:

testing various homographies for ascertaining the best-suited homography; and supplementing the database with the geometry information or the best-suited homography for the present, previously unknown sample carrier type.

10. The method as defined in claim 2, further comprising providing at least two overview images which were recorded with different positions of a sample stage or from different perspectives;

ascertaining how a relative position, which is defined between an image representation of at least one element on the sample stage and an image representation of at least one element on an upper side of the sample carrier, changes between the overview images; and deriving the height of the sample carrier or the homography from the ascertained change in the relative position.

11. The method as defined in claim 2, wherein the determination of the homography comprises:

applying various homographies to the overview image, the various homographies corresponding to different heights, for the purposes of producing a plurality of test images;

assessing which of the test images exhibits the best image rectification; and identifying the homography of the test image exhibiting the best image rectification as the homography by which the overview image is converted perspectively into the plan view image.

12. The method as defined in claim 1, further comprising obtaining at least two overview images from different observation angles and deriving the height of the sample carrier from image differences between the at least two overview images.

13. The method as defined in claim 2, further comprising locating a plurality of sample regions in the plan view image using image analysis, wherein the plan view image is calculated from the overview image with the aid of the determined homography; and ascertaining and outputting the sample region in which the measurement location is located, wherein the locating of the plurality of sample regions in the plan view image comprises:

segmenting the plan view image into classes, which comprise two or more of the classes "sample chamber", "sample region", "sample carrier" and "background", or detecting sample chamber image representations in the plan view image and estimating the geometric extents.

14. The method as defined in claim 13, further comprising refining the segmentation or detection by a regular pattern that corresponds to the sample carrier, wherein different patterns are stored for different sample carriers, or the pattern is derived from the sample chamber image representations ascertained by segmentation or detection.

15. The method as defined in claim 1, further comprising ascertaining a sample carrier type, wherein associated sizes and arrangements of sample chambers are stored in each case for various sample carrier types;

locating sample regions in the overview image or output image by image analysis comprising:

ascertaining a position of the image representation of the sample carrier in the overview image or output image; and deriving image regions of sample chamber image representations from the ascertained position and the ascertained sample carrier type.

16. The method as defined in claim 1, further comprising calibrating an overview camera relative to an optical axis of a microscope objective by:

recording a calibration image;

ascertaining a homography or mapping in respect of a certain height plane, by which the calibration image is perspectively converted into a plan view calibration image;

ascertaining a point of intersection of the optical axis with the determined height plane in the plan view calibration image; and storing the coordinates of this point of intersection in the plan view calibration image for use as coordinates of the measurement location to be identified in a plan view image.

17. A microscope comprising:

an overview camera for recording an overview image of a sample carrier, wherein image coordinates of a location in the overview image at which an optical axis of the microscope hits or penetrates an object to be examined depend on a height of the sample carrier; and a computing unit, which is configured to:

determine a mapping by which the overview image is perspectively convertible into a plan view image on the basis of the height of the sample carrier, wherein image coordinates of the location at which the optical axis of the microscope hits or penetrates the object to be analyzed are known in the plan view image; and using the determined mapping to identify image coordinates of the location at which the optical axis of the microscope hits or penetrates the object to be analyzed in the overview image or in an output image derived therefrom.

18. A method for ascertaining a measurement location of a microscope, comprising:

providing a calibration pattern with a known geometry on a sample carrier;

receiving an overview image of the sample carrier;

localizing an image representation of the calibration pattern in the overview image or in a further overview image by image analysis;

deriving at least one of a height of the sample carrier or a homography, from a localized relative position or perspective distortion of the image representation of the calibration pattern;

determining a mapping by which the overview image is perspectively convertible into a plan view image in dependence of the height of the sample carrier; and identifying, with the aid of the determined mapping, the measurement location in the overview image or in an output image derived therefrom.

* * * * *